US00RE34724E

United States Patent [19]

Hosono et al.

[11] E Patent Number: Re. 34,724

[45] Reissued Date of Patent: Sep. 13, 1994

[54] DEVELOPING APPARATUS FOR ELECTROSTATIC IMAGE

[75] Inventors: Nagao Hosono, Hachioji; Koichi Kinoshita, Narashino; Toru Takahashi, Tokyo, all of Japan

[73] Assignee: Canon Kabushiki Kaisha, Tokyo, Japan

[21] Appl. No.: 557,115

[22] Filed: Jul. 25, 1990

Related U.S. Patent Documents

Reissue of:

[64] Patent No.: 4,458,627
Issued: Jul. 10, 1984
Appl. No.: 340,299
Filed: Jan. 18, 1982

U.S. Applications:

[60] Division of Ser. No. 267,771, May 28, 1981, Pat. No. 4,386,577, which is a continuation of Ser. No. 938,494, Aug. 31, 1978, abandoned.

[30] Foreign Application Priority Data

Sep. 10, 1977 [JP] Japan ..... 52-109240
Sep. 10, 1977 [JP] Japan ..... 52-109241

[51] Int. Cl.[5] ..... G03G 15/09

[52] U.S. Cl. ..... 118/657; 118/658; 355/259

[58] Field of Search ..... 355/251, 253, 245, 259; 118/657, 658, 261; 427/14.1

[56] References Cited

U.S. PATENT DOCUMENTS

| | | | |
|---|---|---|---|
| 3,292,045 | 12/1966 | Buhler | 317/3 |
| 3,667,428 | 6/1972 | Smith | 118/637 |
| 3,731,146 | 5/1973 | Bettiga et al. | 317/3 |
| 3,754,526 | 8/1973 | Caudill | 118/637 |
| 3,754,963 | 8/1973 | Chang | 117/17.5 |
| 3,882,821 | 5/1975 | Katayama et al. | 118/637 |
| 3,909,258 | 9/1975 | Kotz | 96/1 R |
| 3,942,474 | 3/1976 | Smith et al. | 118/637 |
| 3,945,343 | 3/1976 | Berkowitz | 118/623 |
| 4,007,682 | 2/1977 | Gundlach | 101/348 |
| 4,011,834 | 3/1977 | Stephan | 118/653 |
| 4,014,291 | 3/1977 | Davis | 118/657 |
| 4,043,657 | 8/1977 | Karnik | 355/10 |
| 4,100,884 | 7/1978 | Mochizuki et al. | 118/653 |
| 4,154,520 | 5/1979 | Nishikawa et al. | 427/14.1 X |
| 4,232,628 | 11/1980 | Shelffo | 118/653 |
| 4,356,245 | 10/1982 | Hosono et al. | 430/132 |

FOREIGN PATENT DOCUMENTS

| | | |
|---|---|---|
| 2031500 | 1/1971 | Fed. Rep. of Germany . |
| 2257030 | 6/1973 | Fed. Rep. of Germany . |
| 2708299 | 9/1977 | Fed. Rep. of Germany . |
| 43-029471 | 12/1968 | Japan . |
| 45-002877 | 1/1970 | Japan . |
| 46-008114 | 3/1971 | Japan . |
| 47-013089 | 3/1972 | Japan . |
| 49-010259 | 3/1974 | Japan . |
| 50-146409 | 11/1975 | Japan . |
| 51-130232 | 11/1976 | Japan . |
| 52-002535 | 1/1977 | Japan . |
| 52-067640 | 6/1977 | Japan . |
| 52-073736 | 6/1977 | Japan . |
| 52-102732 | 8/1977 | Japan . |
| 23988 | 6/1965 | United Kingdom . |
| 1388023 | 3/1975 | United Kingdom . |
| 1420772 | 1/1976 | United Kingdom . |
| 1484509 | 9/1977 | United Kingdom . |
| 1501464 | 2/1978 | United Kingdom . |
| 1506199 | 4/1978 | United Kingdom . |
| 1506727 | 4/1978 | United Kingdom . |
| 1549413 | 8/1979 | United Kingdom . |

*Primary Examiner*—R. L. Moses
*Attorney, Agent, or Firm*—Fitzpatrick, Cella, Harper & Scinto

[57] ABSTRACT

A developing device for electrophotography includes a developer supporter faced to an image bearing member with a constant space maintained therebetween at a developing station, a developer supply and an elastic developer limiting member maintained in predetermined pressure contact with the developer supporter between the developer supply and the developing station to limit the thickness of developer supported on the supporter to a value not causing contact of the developer with the non-imaged area on the image bearing member.

20 Claims, 2 Drawing Sheets

DEVELOPING APPARATUS FOR ELECTROSTATIC IMAGE

Matter enclosed in heavy brackets [ ] appears in the original patent but forms no part of this reissue specification; matter printed in italics indicates the additions made by reissue.

This is a division of application Ser. No. 267,771, filed May 28, 1981, U.S. Pat. No. 4,386,577, which is a continuation application of U.S. Ser. No. 938,494 filed Aug. 31, 1978, now abandoned.

BACKGROUND OF THE INVENTION

1. Field of the Invention

The present invention relates to an apparatus for developing an electrostatic image, and more particularly to a developing apparatus wherein the thickness of a layer of toner on a toner carrying member can be limited.

2. Description of the Prior Art

The conventional methods employed in the developing apparatus in electrophotography and electrostatic recording can be classified into dry developing methods and wet developing methods. The former can further be classified into those utilizing a two-component developer and those utilizing a single-component developer. The two-component methods include, according to the classification by the species of carrier employed in combination with the toner, a magnetic brush method utilizing iron power carrier, a cascade developing method, utilizing bead carrier, a fur brush method utilizing a fur brush etc. Also the single-component methods include a powder cloud method in which the toner particles are used in a state of sprayed cloud, a contact development or toner development method in which toner particles are brought into direct contact with a surface carrying electrostatic image, a jumping development method in which the toner particles are not brought into direct contact with said surface but are electrically charged and made to fly toward said surface by the electric field of the electrostatic image, a magnetic dry developing method in which magnetic electroconductive toner particles are brought into contact with the surface carrying the electrostatic image etc.

The two-component developing methods employing a mixed developer consisting of carrier particles and toner particles of which the latter are consumed in much larger proportion than the former to alter the mixing ration of said particles with the progress of development, is fundamentally associated with the drawbacks of the fluctuation of image density resulting from said change in the mixing fraction and the deterioration of image quality resulting from the deterioration of carrier particles which remain unconsumed for a prolonged period.

On the other hand, among the single-component developing methods, the magnetic dry developing method utilizing magnetic toner and the contact developing method not utilizing magnetic toner both involve indiscriminate contact of toner particles with the entire surface to be developed, image area and non-image area inclusive, which tends to cause toner deposition even in the non-image area, thus resulting in so-called background fog. Such background fog is also unavoidable in the two-component developing methods. Also the powder cloud method is associated with said background fog resulting from deposition of toner particles in powder cloud state on the non-image area.

As a single-component developing method there is already known so-called jumping development method as disclosed in the U.S. Pat. Nos. 2,839,400 and 3,232,190 wherein a toner carrying member such as a sheet member uniformly coated with toner particles is maintained at a small distance from a surface carrying an electrostatic image, and the toner particles are attracted from said carrying member toward said image carrying surface by means of the electric charge of electrostatic image thereby performing the development of said image. The above-mentioned method is advantageous in that it is almost free from the above-mentioned background fog as the toner particles is not attracted in the non-image area having no electrostatic charge nor brought into contact with the non-image area, and also in that it is free from the above-mentioned change of mixing ratio and also from the deterioration of carrier particles since there are no carrier particles involved.

However, the above-mentioned method have been associated with other drawbacks which are enumerated in the following:

(1) difficulty in obtaining practically uniform toner coating. Uniform toner deposition is difficult to obtain although the toner carrying sheet is previously provided with an electric field to facilitate toner deposition. Different from liquid coating, a thin and uniform coating of particles is difficult to achieve for example with a known rigid blade. Uneven coating is not suitable for practical image reproduction as the unevenness is directly reproduced on the developed image. As an improvement it has been proposed to use a cloth or paper as the toner carrying sheet and embedding the toner particles into the fibers thereof, but it is still difficult to obtain a uniform coating as the toner particles finer than the fiber size is difficult to prepare. Also the toner deposition onto the toner carrying sheet by cascade developing method is not practical as it requires a large-sized apparatus.

(2) Difficulty in uniform toner removal from the toner carrying member. The coated toner layer, when brought into facing relationship with the electrostatic image, should cause uniform removal and transfer of toner as otherwise uniform image development cannot be expected. Such uniform removal of toner particles depends on the surface characteristics of sheet carrying the toner particles, the coating condition thereon and the characteristics of toner particles, and has never reached the practically acceptable level.

(3) Low image resolution.

In the known jumping development method the toner particles are electrostatically deposited on the toner carrying member, and, even if a relatively thin toner layer is formed on said carrying member, the toner particles are considered to fly toward the surface carrying the electrostatic image by the mutually repulsive charges of said toner particles when the distance to said surface is reduced to approximately 3 mm. However the flight of toner particles over such a wide distance from the toner carrying surface to the image holding surface requires a long time and tends to be influenced by the air stream flowing through the gap, the toner gravity, and the eventual vibration of image carrying surface or toner carrying member, giving rise to deterioration of developed image. Also the electric field of fine lines or fine characters in the electrostatic image does not exactly reach the toner carrying surface, so that there may result thinning of fine lines of fine characters, or significant deterioration of resolution due to the lack of flight of toner particles. On the other hand if said distance is rendered too small, it is again difficult to obtain exact reproduction as the fine lines or fine characters tend to become thicker.

SUMMARY OF THE INVENTION

The object of the present invention, therefore is to provide an apparatus for developing electrostatic image free from the above-mentioned drawbacks and capable of providing stable image quality with high, fidelity. More specifically the object of the present invention is to provide a developing apparatus for developing an electrostatic image constructed:

(a) to form a uniform toner layer by means of a simple device;

(b) to maintain an extremely thin toner layer of a uniform thickness in the developing station; and (c) to form a toner layer allowing uniform release of toner particles toward the surface carrying electrostatic latent image, whereby the toner layer is maintained separate from the non-image area to completely eliminate the background fog, and the toner particles are released from the carrying member thereof so as to form a uniform toner image of an elevated resolution in the image area. The image area on the surface carrying an electrostatic image thereon herein used shall mean an area on which the developer is to be deposited in the developing step, while the non-image area shall mean an area which should be free from toner deposition.

Another object of the present invention is to provide a developing apparatus for electrostatic image comprising a movable developer supporting member maintained in the developing station in facing relationship to an electrostatic image carrying surface and with a distance therefrom not causing contact of developer supported on said member with the non-image area, a developer supplying means for supplying developer to said movable developer supporting member, and a developer layer limiting member composed of an elastic material maintained in pressure contact with said developer supporting member in a position between said developer supplying means and the developing station, said plastic limiting member being adapted to form a developer layer to be transported to the developing station.

Still other objects and advantages of the present invention will be made apparent from the detailed description thereof to be made in the following with reference to the attached drawings.

DESCRIPTION OF THE PREFERRED EMBODIMENTS

Figure 1:
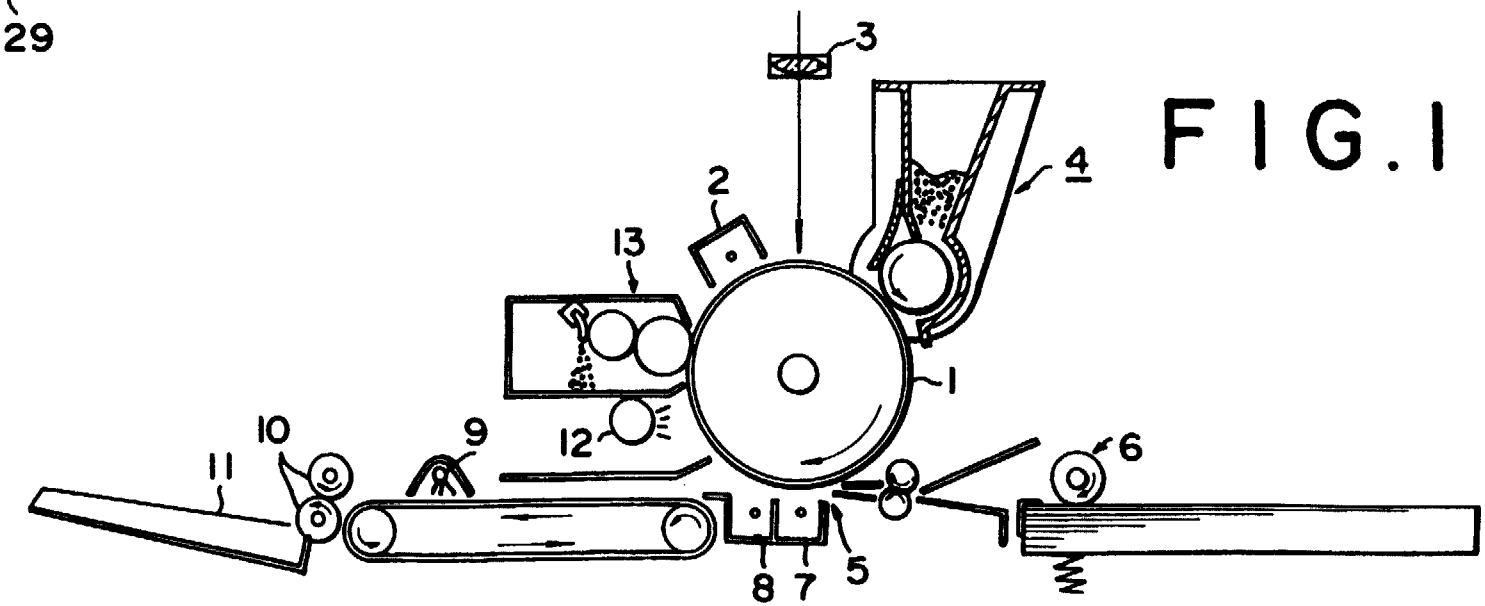
FIG. 1 is a schematic explanatory view of an electrophotographic apparatus utilizing the developing apparatus embodying the present invention.

FIG. 1 schematically shows an example of a copying apparatus or recording apparatus in which the developing apparatus of the present invention is applicable though the application thereof is naturally not limited thereto.

In FIG. 1 there are shown a photosensitive drum 1 comprising a photoconductive layer which may be provided or not with an insulating layer on the surface thereof and which may be formed in a sheet or a belt, a known sensitizing charger 2, and an image projecting device 3 for projecting an original image, a light image or a light beam modulated by an image signal. By means of the above-mentioned components there is formed an electrostatic image on said photosensitive member 1 through so-called Carlson process, process disclosed in the U.S. Pat. Nos. 3,666,363 and 4,071,361 or other suitable processes. There is also shown a developing apparatus 4 of the present invention, which forms a visible toner image corresponding to said electrostatic image on said photosensitive member 1. The thus developed visible image is transferred, in a transfer station 5, onto a transfer sheet supplied from a paper feed station 6, wherein 7 indicates a transfer charger. After said transfer, the transfer sheet is subjected to charging for separation by a charger 8, then to heat fixing by a fixing lamp 9 during transportion on a conveyor belt, and ejected by a paper eject roller 10 onto a tray 11 provided outside the apparatus. On the other hand the photosensitive drum 1 is subjected to charge elimination by flash exposure to a lamp 12 and to removal of remaining developer in a cleaning station, thereby being prepared for the next copying cycle. Also in the above-explained apparatus it is possible to employ a so-called electrostatic image transfer process wherein the electrostatic image formed on the photosensitive member 1 is transferred onto another image carrying member and then is rendered visible by the developing apparatus 4.

Figure 2:
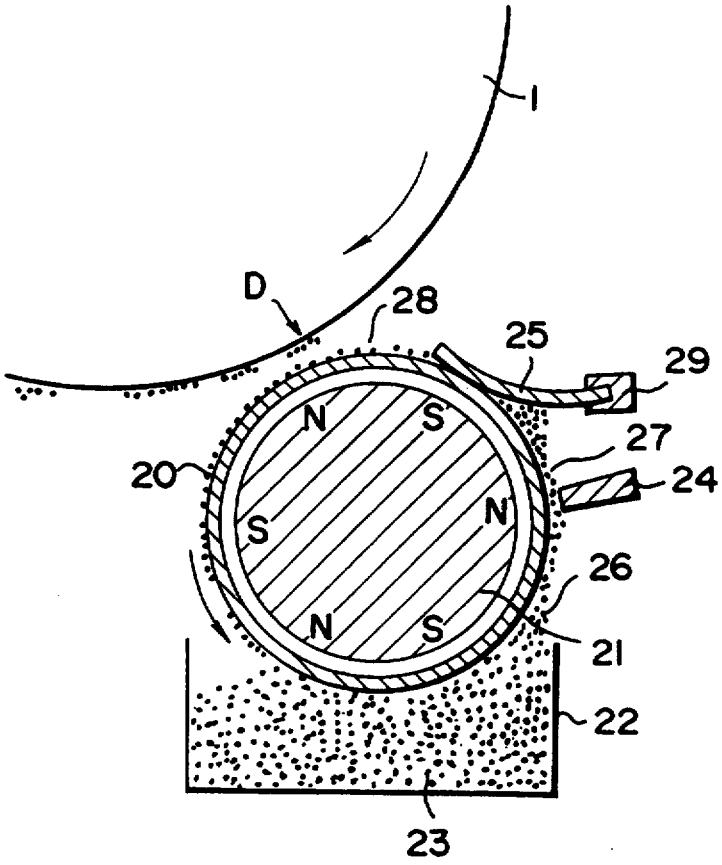
FIG. 2 is a cross-sectional view of an embodiment of the developing apparatus of the present invention.

FIG. 2 shows another embodiment of the developing apparatus of the present invention, wherein 1 is the above-mentioned photosensitive drum rotated in the direction of arrow, and 20 is a sleeve or cylinder made of a non-magnetic material such as aluminum rotated in the direction of arrow at a constant speed by means of an unrepresented motor. Thus, in the developing position D said sleeve or cylinder 20 is displaced in a substantially the same direction as the drum 1, with a peripheral speed substantially identical with that of said drum 1 in order to prevent eventual inertial effect resulting from the movement of the sleeve 20 on the toner particles to be transferred onto said drum, thereby obtaining a toner image without unacceptable unevenness in the density. 21 is a multi-pole magnet provided inside said toner supporting sleeve 20. In the illustrated embodiment the magnet 21 is fixed in such a manner that an N-pole forms a magnetic field in the developing position D substantially perpendicular to the surface of toner supporting means and also to the electrostatic image carrying member, but it may also be rotated if desired. In the developing position the sleeve 20 and the drum 1 are maintained in a facing relationship with such a distance therebetween that the outermost portion, facing the non-image area, of the toner layer formed into a brush-like state under the influence of magnetic field is still separated from the drum periphery, or, stated differently, the toner layer is unable to come into contact with the non-image area, and the particles in said toner layer is still capable of transferring to the image area under the effect of electrostatic attractive force. Namely in the developing position D where the toner transfer takes place, the periphery of sleeve 20 is separated from the periphery of drum 1 by such a distance that the above-mentioned toner layer does not come into contact with the drum periphery not having electrostatic image thereon. In order to maintain said constant distance, the sleeve 20 is for example provided with a coaxial roller which is pressed, for example by a spring, against said drum to perform fractional rotation, wherein the diameter of said roller being larger than that of said sleeve by said distance. In this manner the sleeve 20 is rotated with a peripheral speed substantially identical to that of the drum 1, the direction of rotation being same in the developing position. 22 is a toner container holding magnetic toner 23, with which the sleeve 20 is maintained in contact in the lower portion thereof to scoop up said magnetic toner 23 along the upwardly moving periphery. Thus the magnetic toner is attracted to the sleeve 20 by the magnetic force of said magnetic 21 and transported with the rotation of sleeve 20 by the friction therewith.

24 is a rigid plate provided to or slightly lower than face a magnetic pole for removing a part of the thick toner layer 26 transported from the container 22 thereby forming a toner layer 27 of which thickness is approximately the same as or smaller than the distance between the drum 1 and sleeve 20 at the developing position D. Thus said rigid toner limiting plate 24 is positioned so as to be separated from the sleeve 20 by a distance approximately the same as or smaller than the distance between the sleeve 20 and drum 1 at said developing position. Also said rigid plate may be replaced by a rotated rigid roller separated from said sleeve by the above-mentioned distance. In either form, said rigid limiting member functions to limit the thickness of toner laye to a value approximately the same as or preferably smaller than the distance between the drum surface 1 and the sleeve surface 20. The above-mentioned rigid limiting member is provided to prevent that a coagulated toner particle of a size larger than said instance eventually formed in the toner layer, passing through the succeeding limiting member 25, is crushed in the gap between the drum 1 and the sleeve 20 and grows therein thereby giving undesirable effect to the developed image. The above-mentioned rigid limiting member functions to crush such coagulated toner particle to a size capable of passing through said gap.

25 is a flexible toner layer limiting plate made of an elastic material such as rubber and provided downstream of said rigid limiting member 24 and upstream of the developing position D along the rotational movement of the sleeve 20. Said elastic plate 25 is supported at an end thereof by a support member 29 and maintained at the other end thereof in pressure contact with the periphery of toner supporting sleeve 20, forming a contact portion therebetween. Said elastic plate 25 functions to limit the thickness of the thin toner layer 27 formed by said rigid limiting member 24 thereby forming a thinner toner layer 28. Said plate 25, when made of rubber of a hardness of 70 degrees, is in pressure contact under a pressure of 0.4 to 40 gr/cm in the axial direction of the sleeve 20. The toner layer becomes too thick or too thin respectively when the pressure is under or above said range. As an example, a limiting member 25 made of urethane rubber or silicon rubber and maintained in contact with the sleeve 20 under a pressure of ca. 8 gr/cm allows the obtaining of a uniform toner layer of a thickness of approximately 50$\mu$.

The above-mentioned use, as the second limiting member 25, of an elastic member in pressure contact with the sleeve 20 is intended to reduce the quantity of passing toner by the contact portion formed with the sleeve 20 thereby forming a thin toner layer preferably of a thickness smaller than 100$\mu$, and also for rendering the thickness of the toner layer satisfactorily uniform by means of the elastic recovering force resulting from the deformation caused by the passage of toner particles. More specifically, although the member 25 is maintained at an end thereof in pressure contact with the periphery of sleeve 20, an extremely thin toner layer can pass therethrough because of the elasticity of said member 25. When a locally somewhat thicker toner layer is going to pass through the contact portion between the elastic member 25 and the sleeve 20, the elastic recovering force of said member 25 increases to reduce the thickness of toner layer, and vice versa. In this manner it is therefore possible to maintain the toner layer at a satisfactorily uniform thickness. The member 25 is maintained on a lateral surface thereof with the sleeve 20 not only for forming a thin and uniform toner layer but also for extending the contact portion along the periphery of sleeve 20 to prolongate the contact region of toner and sleeve 20 thereby ensuring frictional charging to be caused between the insulating toner particles and the non-magnetic sleeve 20. Also in order to improve the frictional charging efficiency, the elastic member 25 is preferably made of a material suitably selected from the triboelectric series for providing a charge of a desired polarity to the toner particles upon friction therewith. For example in case of positive charging of toner particles composed of polystyrene, magnetite, carbon etc., the charging efficiency can be improved by employing an elastic limiting member 25 composing of ethylene-propylene rubber, fluorinated rubber, natural rubber, polychlorobutadiene, polyisoprene, N.B.R. etc., and in case of negative charging there can be employed an elastic limiting member composed of silicon rubber, polyurethane, styrene-butadiene rubber etc. Also the use of a conductive rubber suitably selected in the triboelectric series prevents excessive charging of toner, thereby preventing or destructing electrostatic coagulation or solidification of toner particles.

Naturally the effect of forming a thin and uniform toner layer and the effect of causing friction between the toner and sleeve are expectable also when the elastic member is maintained in pressure contact at a ridge of front end thereof with the sleeve 20, but these effects are enhanced when the contact is achieved on a lateral face of said elastic member. Now with regards to the relationship between the contact position of elastic member 25 with sleve 20 and the position of magnetic pole of the magnet provided inside non-magnetic sleeve 20, a toner layer limiting performed in front of a magnetic pole as illustrated, namely in the presence of a magnetic field (preferably perpendicular to the surface of sleeve 20) in the contact region between the member 25 and sleeve 20, provides a uniform but somewhat thicker toner layer, while a limiting performed between adjacent magnetic poles provides a thinner but somewhat uneven toner layer. However, the extent of said unevenness is naturally very small and much smaller than that observed in the conventional apparatus.

Figure 3:
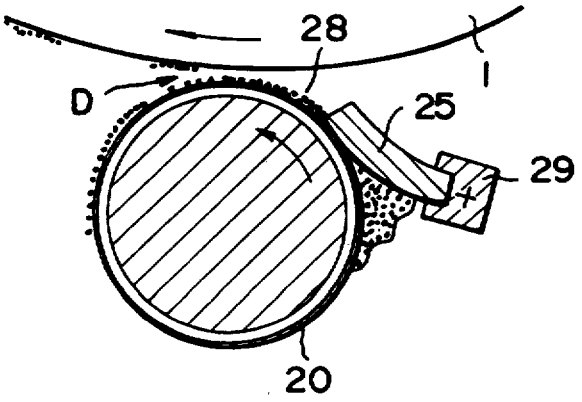
FIGS. 3 and 4 are explanatory views showing the position of an elastic limiting plate shown in FIG. 2.
Figure 4:
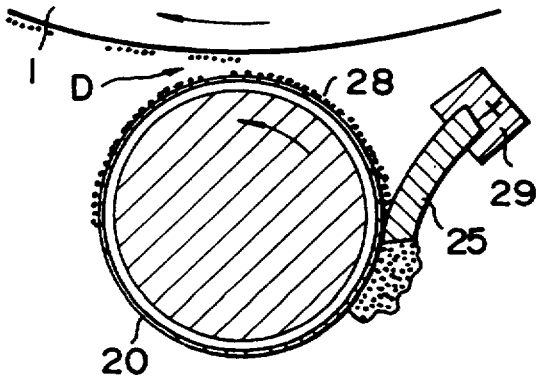

The pressure contact of the elastic limiting plate 25 to the sleeve 20 can be achieved, with respect to the rotating direction thereof, in a forward manner or in a reverse manner as respectively shown in FIGS. 3 and 4. The forward contact, as shown in FIG. 3, means an arrangement in which the distance between the plate 25 and the periphery of sleeve 20 is decreasing in the rotating direction thereof, while the reverse contact, as shown in FIG. 4, means an arrangement of plate 25 wherein the distance between said plate and periphery of sleeve 20 is increasing in the rotating direction thereof. The arrangement shown in FIG. 3 is advantageous in that it provides a relatively thick toner layer to increase the developed toner density, whereas the arrangement shown in FIG. 4 is advantageous in that it provides a toner image of extremely fine granularity as coarse toner particles in the toner layer are blocked by the slit formed between the front ridge of plate 25 and the periphery of sleeve 20. Although the elastic plate is maintained in contact with the sleeve 20 on a lateral face, the contact may also be achieved at a ridge of the front end of said plate 25.

Figure 5:
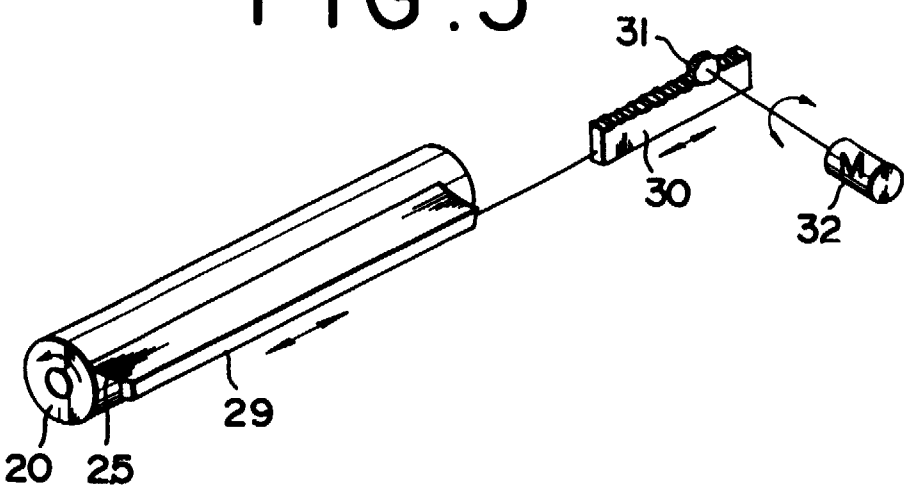
FIG. 5 is a perspective view of a mechanism for moving the elastic limiting plate shown in FIG. 2.

An eventual trapping of toner coagulate etc. between the elastic limiting member 25 and the periphery of sleeve 20 may result in a slight unevenness on the toner layer to be formed, but this trouble can be solved by oscillating the elastic limiting member, while being maintained in pressure contact with the toner supporting surface, in a direction orthogonal to or parallel to the advancing direction of said surface or in an another direction. FIG. 5 shows a mechanism for this purpose, in which the support member 29 for the elastic plate 25 is connected to a rack 30 engaging with a pinion gear 31 which is oscillatingly rotated by a forward-reverse motor 32 with a short period thereby oscillating the elastic plate 25 in the axial direction of the sleeve 20. Naturally the mechanism as shown in FIG. 5 is not necessary in case the toner coagulates are not formed or the effect thereof is negligible even if they are formed.

Further, it is also effective to employ an elastic limiting plate 25 composed of two or more laminated plates of different elastic moduli, and to select the material of the plate maintained in pressure contact with the sleeve 20 and coming into contact with the toner and the material of other plates supporting the contacting force so as to obtain a thin toner layer of an improved evenness.

Furthermore, the elastic limiting member is not necessarily limiting to a plate member but also can be composed of a rubber roller, a felt plane, a roller or an elastic metal plate, but a rubber plate is advantageous in that it provides a stable function of forming a uniform thin toner layer with a simple structure. Whether in plate shape or in roller shape, the rubber to be employed is preferably of a hardness not exceeding 70 degrees, since a higher hardness may result in a slight unevenness in the toner layer as much limiting member, when a giant toner particles is trapped thereunder, may form a gap allowing free passage of smaller toner particles. Furthermore, in case of a limiting member made of rubber, there should be employed a winterized rubber in order to prevent a deteriorated function resulting from hardening in a cold season.

In the embodiment shown in FIG. 2, the advantages of employing a magnetic toner and rotating the toner supporting sleeve 20 around the magnet 21 lie, in addition to those explained in the foregoing, in that the toner can be continuously supplied to the limiting member 25 and that the toner particles gathered in a brush-shape perform the movements of standing up and tumbling when the sleeve 20 supporting the magnetic toner thereon passes through the magnetic field thereby achieving an improved uniformity of the toner distribution. However the present invention is naturally applicable to the developing apparatus utilizing non-magnetic toner.

Although the toner supporting member in the foregoing embodiments is cylindrical, it may also be formed as an endless belt having an endless toner supporting surface provided between plural rollers. In such case there will be provided along the path of said endless belt, similar to FIG. 2, a toner supply station (container)22, a rigid limiting member 24 spaced from said belt by a small distance and an elastic limiting member 25 maintained in pressure contact with said belt, said belt being maintained in the developing position separate from the image carrying member by such a small distance as not to cause contact of toner with the non-image area but to allow transfer of toner to the image area, thereby performing development of the electrostatic image by means of a toner layer formed on said belt by the above-mentioned various means. It is also possible to utilize a magnetic toner and to provide magnets corresponding to the developing position or along the entire path of said endless belt. Now there will be given an explanation on the composition and material of the components commonly used in the foregoing embodiments.

The magnetic toner is for example composed of a mixture of 50 parts of polystyrene, 40 parts of magnetite, 3 parts of a charge controlling agent and 6 parts of carbon and formed into particles of an average particle size of 5 to 10$\mu$ by a known process, but any other known magnetic toners are naturally usable also for this purpose. The toner supporting member is made of an aluminum cylinder. The magnet is provided with a surface flux density within a range of 600 to 1300 gauss, for example 800 gauss, when a magnetic pole is positioned where the toner supporting member is closest to the image carrying member holding an electrostatic image of a potential contrast of ca. 600 V.

The image development according to the present invention is achieved by the formation of such a toner layer as to be separate from the non-image area of the image carrying surface and as to allow toner transfer in the image area thereof. At said toner transfer, the toner layer facing the image area increases the thickness thereof under the attractive force of electric field and the toner particles develop erect and extending brush-like chains (a phenomenon hereinafter called "toner extention") under the influence of magnetic field in a position corresponding to a magnetic pole, whereby thus extended toner comes into contact with the image area of image carrying surface when it approaches the surface of toner layer and a part of toner remains on said image carrying surface when it is separated from the toner layer, thereby completing the image development. This method, different from so-called contact development or jumping development, is considered to achieve image development by toner contact with the image area through said toner extention while toner is maintained contact-free in the non-image area.

When the distance between the surface of toner layer and the image carrying surface is larger, the image development is considered to be achieved, in addition to the above-explained development of the toner contact through the toner extension by a phenomemon in which the toner chains extending but not reaching the image carrying surface are also maintained erect in the electric field and the end portion of said chains are torn and fly toward the image carrying surface.

Thus the present invention allows to achieve the image development by the above-mentioned toner extention phenomenon and also the image development by the co-existing toner flight phenomenon according to the distance between the image carrying surface and the toner supporting member. The utilization of said toner extension phenomenon wherein the toner layer is rendered erect and extending to directly contact the image carrying surface in the image area thereof allows to reduce the amount of toner flying across the developing gap, and it is possible to obtain an excellent image quality completely free from background fog when the dimension of gaps are selected suitably so as to minimize the effect of air stream in said gap, weight of toner, and vibrations of image carrying surface and toner supporting member. In order to ensure satisfactory toner extension, the distance between the image carrying surface and the surface of toner layer in non-extended state in the non-image area should not exceed three times of the toner layer thickness. Also in order to achieve a development principally by said toner extension but also by the co-existing toner flight phenomenon, said distance should not exceed ten times of the toner layer thickness.

Based on the experimental analysis and theoretical analysis including the foregoing explanation, the distance D between the toner supporting member and the electrostatic image carrying surface is preferably within a range from 50 to 500$\mu$, wherein the upper limit is determined from a requirement of reproducing with a satisfactory resolution a character printed with the smallest commercial type-face (100$\mu$), while the lower limit is determined in relation to the thickness of toner layer. Also experimentally the thickness t of toner layer to be supported on the toner supporting member is preferably within a range from 30 to 300$\mu$. At the image development said toner layer is extended under the influence of a magnetic field to a height which is considered to be in the order to three times of said thickness as explained in the foregoing. In order to allow the surface of toner layer to reach the image carrying surface, thereof, the distance s between the surface of toner layer and the image carrying surface should not exceed 300$\mu$. In general satisfactory results are obtained when $s \geqq t/5$. A predetermined distance between the image carrying surface and the toner supporting member can be maintained by a positioning member such as a spacer, a roller and a spring which is in abutment with the image carrying surface or a counter electrode provided therebehind and is engaging with the toner supporting surface.

In addition to the foregoing advantages, the developing apparatus of the present invention, when applied to the copying or recording apparatus utilizing particularly a transfer process, exhibits an extremely excellent transfer effect, thereby enabling to reproduce an image of an extremely high quality without background fog on a plain paper etc.

Naturally the present invention is not limited to the foregoing embodiments but includes the modifications and variations within the scope of the present invention.

What we claim is:

[1. A developing apparatus for developing with a powder developer, comprising:

a movable developer supporting member provided in facing relationship with an image carrying means in a developing station for developing a latent image carried on the image carrying means, said supporting member being separated from the image carrying means by a predetermined distance;

means for supplying powder developer to said supporting member; and an elastic developer limiting member having a free end upstream of the developing station, with respect to the direction of movement of the developer, which is maintained in predetermined pressure contact with said developer supporting member at a position between said developer supply means and the developing station.]

[2. An apparatus according to claim 1, wherein said elastic limiting member has a hardness of 70 degrees and applies a pressure of between 0.4 and 40 grams per centimeter.]

[3. A developing apparatus for developing with a powder developer, comprising:

a movable developer supporting member provided in a developing station in facing relationship with the surface of an image carrying member and separated therefrom by a predetermined distance;

means for supplying powder developer to said movable developer supporting member;

a first developer layer limiting member provided between said supply means and the developing station and separated from said developer supporting member by a predetermined distance; and a second developer layer limiting member provided between said first limiting member and the developing station, said second limiting member being composed of elastic material and having a free end system of the developing station, with respect to the direction of movement of the developer, maintained in predetermined pressure contact with said developer supporting member.]

[4. A developing apparatus according to claim 3, wherein said first limiting member is a rigid member.]

[5. A developing apparatus for developing with powder developer, comprising:

a movable developer supporting member provided in a developing station in facing relationship with the surface of an image carrying member and separated therefrom by a predetermined distance;

means for generating a magnetic field in the developing station;

magnetic developer supply means for supplying magnetic powder developer to said developer supporting member; and an elastic developer layer limiting member provided at a position between said developer supply means and the developing station and having a free end upstream of the developing station, with respect to the direction of movement of the developer, maintained in predetermined pressure contact with said developer supporting member.]

[6. A developing apparatus for developing with a powder developer, comprising:

a movable developer supporting member provided in a developing station in facing relationship with the surface of an image carrying member and separated therefrom by a predetermined distance;

magnetic developer supply means for supplying magnetic powder developer to said developer supporting member; and an elastic developer limiting member provided at a position between said developer supply means and the developing station and having a free end upstream of the developing station, with respect to the direction of movement of the magnetic developer maintained in predetermined pressure contact with said developer supporting member.]

[7. A developing apparatus for developing with a powder developer, comprising:

a movable developer supporting member provided in a developing station in facing relationship with the surface of an image carrying member and separated therefrom by a predetermined distance;

means for generating a magnetic field in the developing station;

magnetic developer supply means for supplying magnetic powder developer to said developer supporting member;

an elastic developer limiting member at a position between said developer supply means and the developing station and having a free end system of the developing station, with respect to the direction of movement of the magnetic developer, maintained in predetermined pressure contact with said developer supporting means; and means for generating a magnetic field where said elastic limiting member is in contact with said developer supporting member.]

[8. A developing apparatus according to claim 7, wherein said means for generating a magnetic field in the developing station and said means for generating a magnetic field where said elastic limiting member is in contact with said developer supporting member are composed of the same magnet.]

[9. A developing apparatus according to claim 7, wherein said elastic limiting member is a rubber plate.]

[10. A developing apparatus according to claim 9, wherein said rubber limiting plate is maintained in pressure contact in the forward direction with respect to the moving direction of said developer supporting member.]

[11. A developing apparatus according to claim 9, wherein said rubber limiting plate is maintained in pressure contact in the reverse direction with respect to the moving direction of said developer supporting member.]

[12. A dry developing apparatus for developing latent images, comprising:

developer supporting means upon which dry developer may be moved to a developing zone at which said developer supporting means faces a latent image carrying member;

means for supplying dry developer to said developer supporting means; and an elastic thickness limiting member having a free end upstream of the developing zone, with respect to the direction of movement of the developer, which bears on said developer supporting means between the position where developer is supplied onto said developer supporting means and the developing zone, so as to limit the thickness of the developer layer which moves on said developer support means toward the developing zone.]

[13. A developing apparatus according to claim 12, wherein said developer supporting means comprises a member arranged for movement to carry the developer to the developing zone.]

[14. A developing apparatus according to any one of claims 12 or 13, including a further thickness limiting member which is positioned upstream of said elastic thickness limiting member with respect to the direction of movement of the developer so as to limit the thickness of the developer layer moving toward the elastic thickness limiting member and which is separated from the surface of said developer supporting means carrying the developer.]

[15. A developing apparatus according to claim 14, wherein said first thickness limiting member is a rigid member.]

[16. A developing apparatus according to claim 14, including a magnet member for producing magnetic fields in the developing zone and in the regions of each of said thickness limiting members.]

[17. A developing apparatus according to claim 13, wherein said developer supporting means comprises a cylindrical sleeve, said supplying means being arranged to supply developer onto the peripheral surface of said sleeve.]

[18. A developing apparatus according to claim 17, wherein said sleeve is rotatable about its longitudinal axis to cause movement of the developer.]

[19. A developing apparatus according to claim 13, wherein said developer supporting means comprises an endless belt arranged to rotate about a plurality of rollers.]

[20. A developing apparatus according to claim 12, including means for producing a magnetic field at the developing zone.]

[21. A developing apparatus according to claim 12, including means for producing a magnetic field in the region of contact between said elastic thickness limiting member and said developer supporting means.]

[22. A developing apparatus according to claim 12, including a magnet member which produces a magnetic field at both the developing zone and in the region of contact between said elastic thickness limiting member and the developer support means.]

[23. A developing apparatus according to claim 22, wherein said magnet member is stationary so that said magnetic fields produced thereby are stationary.]

[24. A developing apparatus according to claim 22, wherein said magnet member is movable to cause movement of said magnetic fields.]

[25. A developing apparatus according to claim 12, wherein said elastic thickness limiting member is in the form of a resilient plate.]

[26. A developing apparatus according to claim 25, wherein said resilient plate is arranged with a gap between it and said developer supporting means tapering toward the region of pressure contact in the direction of movement of the developer.]

[27. A developing resilient plate is arranged with a gap between it and said developer supporting means tapering toward the region of pressure contact in a direction opposite to the direction of movement of the developer.]

[28. A developing apparatus according to claim 12, wherein said elastic thickness limiting member is a roller.]

[29. A developing apparatus according to claim 12, wherein at the developing zone the gap between said developer supporting means and the latent image carrying member is such as to avoid contact between the developer supported on said developer supporting means and the portion of the latent image on the latent image carrying member which is not to be developed.]

[30. A developing apparatus according to claim 12, including means for vibrating said elastic thickness limiting member to cause said thickness limiting member to oscillate in a direction transverse to the direction of movement of the developer, thereby to avoid the coagulation of developer between said developer supporting means and said thickness limiting member.]

*31. A developing apparatus for developing with a powder developer, comprising:*

*a movable developer supporting member provided in facing relationship with a image carrying means in a developing station for developing a latent image carried on the image carrying means, said supporting member being separated from the image carrying means by a predetermined distance;*

*means for supplying powder developer to said supporting member; and*

*an elastic developer limiting member having a free end upstream of the developing station, with respect to the direction of movement of the developer, which is maintained in predetermined pressure contact with said developer supporting member at a position between said developer supply means and the developing station to regulate a thickness of a layer of the developer particles supplied by said supplying means, wherein said limiting member includes an elastic plate having a surface including a contact portion which is in surface press-contact with said developer supporting member counter-directionally with respect to a movement direction of the developer supporting member, and an extension surface portion which extends toward the downstream direction from the contact portion and which is faced to said developer supporting member, wherein said plate and said developer supporting member cooperate to form a nip, in the contact portion, through which the developer particles are passed so that the thickness of the developer layer is regulated, and wherein the elastic plate has an end portion in the developer particles.*

*32. An apparatus according to claim 31, wherein the plate is press-contacted to said developer supporting member with a line pressure of* 0.4–40 g/cm.

*33. An apparatus according to claim 31 or 32, wherein the elastic plate is of a metal having elasticity.*

*34. An apparatus according to claim 31 or 32, wherein the elastic plate is of a rubber.*

*35. An apparatus according to claim 34, wherein the rubber has a hardness not more than* 70 degrees.

*36. An apparatus according to claim 31, wherein the elastic plate is of material which is positioned in the triboelectric series list such that it triboelectricially charges the developer particles to a predetermined polarity when it is rubbed with the developer particles.*

*37. An apparatus according to claim 31, wherein the elastic plate is of a laminated structure including two or more plates having different elasticities.*

*38. An apparatus according to claim 31, wherein the developer particles comprise nonmagnetic toner.*

*39. An apparatus according to claim 31, wherein a slit is formed between an end portion of said elastic plate and said developer supporting member.*

*40. A developing apparatus for developing with a powder developer, comprising:*

*a movable developer supporting member provided in facing relationship with an image carrying means in a developing station for developing a latent image carried on the image carrying means, said supporting member being separated from the image carrying means by a predetermined distance;*

*means for supplying powder developer to said supporting member; and*

*an elastic developer limiting member having a free end upstream of the developing station, with respect to the direction of movement of the developer, which is maintained in predetermined pressure contact with said developer supporting member at a position between said developer supply means and the developing station to regulate the thickness of a layer of the developer particles supplied by said supplying means, wherein said limiting member includes a plate having rubber elasticity, wherein the plate has a surface including a contact portion which is in surface press-contact with said developer supporting member counter-directionally with respect to a movement direction of the developer supporting member, and an extension surface portion which extends toward the downstream direction from the contact portion and which is faced to said developer supporting member, and wherein said plate and said developer supporting member cooperate to form a nip, in the contact portion, through which the developer particles are passed so that the thickness of the developer layer is regulated.*

*41. An apparatus according to claim 40, wherein the developer particles comprise non-magnetic toner.*

*42. An apparatus according to claim 40, further comprising magnetic field generating means stationarily disposed behind said developer supporting member, wherein said developer supporting member is of non-magnetic material, and the developer particles are magnetic developer particles, and wherein the surface of the plate in the surface press-contact is convex, and wherein the nip is disposed within influence of a magnetic field generated by said magnetic field generating means.*

*43. An apparatus according to claim 40, wherein the plate is disposed to provide a convex surface in contact with the supporting member, and wherein the nip is placed at a position where said developer supporting member moves substantially upwardly.*

*44. An apparatus according to claim 43, further comprising magnetic field generating means stationarily disposed behind said developer supporting member, wherein said developer supporting member is of non-magnetic material, and the developer particles are magnetic developer particles, and wherein the nip is disposed within influence of a magnetic field generated by said magnetic field generating means.*

*45. A developing apparatus for developing with a powder developer, comprising:*

*a movable developer supporting member provided in facing relationship with an image carrying means in a developing station for developing a latent image carried on the image carrying means, said supporting member being separated from the image carrying means by a predetermined distance;*

*means for supplying powder developer to said supporting member; and*

*an elastic developer limiting member having a free end upstream of the developing station, with respect to the direction of movement of the developer, which is maintained in predetermined pressure contact with said developer supporting member at a position between said developer supply means and the developing station wherein said limiting member is an electrically conductive and elastic plate having a surface including a contact portion which is in surface press-contact with said developer supporting member co-directionally with respect to a movement direction of the developer supporting member, and an extension surface portion which extends toward the upstream direction*

*from the contact portion and which is faced to said developer supporting member, and wherein said plate and said developer supporting member cooperate to form a nip, in the contact portion, through which the developer particles are passed so that the thickness of the developer layer is regulated.*

*46. A developing apparatus for developing with a powder developer, comprising:*

*a movable developer supporting member provided in facing relationship with an image carrying means in a developing station for developing a latent image carried on the image carrying means, said supporting member being separated from the image carrying means, by a predetermined distance;*

*means for supplying powder developer to said supporting member; and*

*an elastic developer limiting member having a free end upstream of the developing station, with respect to the direction of movement of the developer, which is maintained in predetermined pressure contact with said developer supporting member at a position between said developer supply means and the developing station wherein said limiting member is an electrically conductive and elastic plate having a surface including a contact portion which is in surface press-contact with said developer supporting member counter-directionally with respect to a movement direction of the developer supporting member, and an extension surface portion which extends toward the downstream direction from the contact portion and which is faced to said developer supporting member, and wherein said plate and said developer supporting member cooperate to form a nip, in the contact portion, through which the developer particles are passed so that the thickness of the developer layer is regulated.*

*47. An apparatus according to claim 45 or 46, wherein the developer particles are non-magnetic toner.*

*48. An apparatus according to claim 45 or 46, further comprising magnetic field generating means stationarily disposed behind said developer supporting member, wherein said developer supporting member is of non-magnetic material, and the developer particles are magnetic developer particles, wherein the surface of the plate in the surface press-contact is convex, and wherein the nip is disposed within influence of a magnetic field generated by said magnetic field generating means.*

*49. An apparatus according to claim 45 or 46, wherein the surface of the plate in the surface press-contact is convex, and wherein the nip is placed at a position where said developer supporting member moves substantially upwardly.*

*50. An apparatus according to claim 49, further comprising magnetic field generating means stationarily disposed behind said developer supporting member wherein said developer supporting member is of non-magnetic material, and the developer particles are magnetic developer particles, and wherein the nip is disposed within influence of a magnetic field generated by said magnetic field generating means.*

* * * * *

UNITED STATES PATENT AND TRADEMARK OFFICE

CERTIFICATE OF CORRECTION

PATENT NO. : RE 34,724

DATED : September 13, 1994

INVENTOR(S) : HOSONO, ET AL.

It is certified that error appears in the above-indentified patent and that said Letters Patent is hereby corrected as shown below:

Column 1

Line 32, "power" should read --powder--.
Line 54, "fraction" should read --ratio--.

Column 2

Line 15, "is" should read --are--.
Line 22, "method" should read --methods--.
Line 25, "difficulty" should read --Difficulty--.
Line 39, "is" should read --are--.
Line 49, "of" should read --of the--.

Column 3

Line 15, "high," should read --high--.

Column 4

Line 18, "process" (second occurrence) should read --processes--.
Line 48, "a" should be deleted.

UNITED STATES PATENT AND TRADEMARK OFFICE

CERTIFICATE OF CORRECTION

PATENT NO. : RE 34,724

DATED : September 13, 1994

INVENTOR(S) : HOSONO, ET AL.

It is certified that error appears in the above-indentified patent and that said Letters Patent is hereby corrected as shown below:

Column 5

Line 2, "is" should read --are--.
Line 39, "laye" should read --layer--.

Column 6

Line 39, "composing" should read --composed--.

Column 7

Line 30, "an" should be deleted.
Line 56, "much" should read --such--.
Line 57, "particles" should read --particle--.
Line 58, "particles." should read --particles. ¶--

Column 12

Line 51, "developing resilient" should read --developing apparatus according to claim 25, wherein said resilient--.

UNITED STATES PATENT AND TRADEMARK OFFICE

CERTIFICATE OF CORRECTION

PATENT NO. : RE 34,724

DATED : September 13, 1994

INVENTOR(S) : HOSONO, ET AL.

It is certified that error appears in the above-indentified patent and that said Letters Patent is hereby corrected as shown below:

Column 13

Line 8, "a image" should read --an image--.

Column 16

Line 13, "in the" should read --in--.
Line 18, "in the" should read --in--.

Signed and Sealed this

Fourth Day of July, 1995

Bruce Lehman

*Attest:*

BRUCE LEHMAN

*Attesting Officer*

*Commissioner of Patents and Trademarks*